(12) United States Patent
Sorger et al.

(10) Patent No.: US 10,753,321 B2
(45) Date of Patent: *Aug. 25, 2020

(54) HOLLOW FILTER ELEMENT, FILTER HOUSING, AND FILTER

(71) Applicant: Mann+Hummel GMBH, Ludwigsburg (DE)

(72) Inventors: Nadine Sorger, Fellbach (DE); Pascal Neef, Leonberg (DE); Pedro Miguel Pereira Madeira, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 618 days.

This patent is subject to a terminal disclaimer.

(21) Appl. No.: 14/974,941

(22) Filed: Dec. 18, 2015

(65) Prior Publication Data

US 2016/0115917 A1    Apr. 28, 2016

Related U.S. Application Data

(63) Continuation of application No. PCT/EP2014/060966, filed on May 27, 2014, and a
(Continued)

(30) Foreign Application Priority Data

Jun. 20, 2013  (DE) .................. 10 2013 010 218
May 13, 2014  (DE) .................. 10 2014 006 852

(51) Int. Cl.
*F02M 35/024*   (2006.01)
*B01D 46/24*   (2006.01)
(Continued)

(52) U.S. Cl.
CPC ... *F02M 35/02425* (2013.01); *B01D 46/0005* (2013.01); *B01D 46/009* (2013.01);
(Continued)

(58) Field of Classification Search
None
See application file for complete search history.

(56) References Cited

U.S. PATENT DOCUMENTS 4,493,717 A   1/1985  Berger et al.
5,413,712 A   5/1995  Gewiss et al.
(Continued)

FOREIGN PATENT DOCUMENTS

DE    19960175 A1   9/2001

*Primary Examiner* — Amber R Orlando
*Assistant Examiner* — Brit E. Anbacht
(74) *Attorney, Agent, or Firm* — James Hasselbeck

(57) ABSTRACT

A hollow filter element, including: a filter medium for filtering a fluid; wherein the filter element is a conical-oval rounded filter element; wherein the filter medium circumferentially surrounds an interior flow space of the filter element, wherein the filter medium circumferentially encloses around an element axis such that filter medium at least in one direction radial to the element axis is smaller on a first of the end sides of the filter medium than on a second of the end sides of the filter medium; wherein the filter medium has a first end body arranged at least on the smaller end side; wherein the first end body has at least one leveling element in the at least one direction of the smaller extent with respect to the element axis in a radially outer segment with respect to the element axis.

10 Claims, 7 Drawing Sheets

Related U.S. Application Data continuation-in-part of application No. 14/017,767, filed on Sep. 4, 2013, now Pat. No. 9,726,123.

(51) Int. Cl.
  *F02M 35/02* (2006.01)
  *B01D 46/00* (2006.01)
  *F02M 35/09* (2006.01)

(52) U.S. Cl.
  CPC ..... *B01D 46/0041* (2013.01); *B01D 46/2414* (2013.01); *F02M 35/0203* (2013.01); *F02M 35/02433* (2013.01); *F02M 35/02483* (2013.01); *B01D 2265/026* (2013.01); *B01D 2275/201* (2013.01); *B01D 2275/208* (2013.01); *F02M 35/09* (2013.01)

(56) References Cited

U.S. PATENT DOCUMENTS

| | | | |
|---|---|---|---|
| 6,152,979 A | 11/2000 | Cappuyns | |
| 7,063,730 B2* | 6/2006 | Connor | B01D 46/0005 55/493 |
| 7,662,203 B2* | 2/2010 | Scott | B01D 46/0001 55/498 |
| 8,657,900 B2* | 2/2014 | Menssen | B01D 45/16 123/198 E |
| 9,132,371 B2* | 9/2015 | Heim | F02M 35/02491 |
| 2001/0018865 A1* | 9/2001 | Wegelin | A47L 5/28 95/268 |
| 2003/0121242 A1* | 7/2003 | Rieger | B01D 46/2414 55/493 |
| 2004/0035094 A1* | 2/2004 | Jersey | B01D 46/0005 55/478 |
| 2008/0010958 A1* | 1/2008 | Fester | A47L 9/122 55/472 |
| 2008/0190082 A1* | 8/2008 | Scott | B01D 46/0005 55/520 |
| 2010/0313533 A1* | 12/2010 | Muenkel | B01D 46/0021 55/484 |
| 2013/0152520 A1 | 6/2013 | Tobe et al. | |
| 2013/0232923 A1 | 9/2013 | Heim et al. | |
| 2014/0298612 A1* | 10/2014 | Williams | A47L 9/10 15/347 |
| 2014/0373495 A1* | 12/2014 | Madeira | B01D 46/2411 55/502 |
| 2015/0013288 A1* | 1/2015 | Hasenfratz | F02M 35/02416 55/497 |
| 2015/0013289 A1* | 1/2015 | Hasenfratz | F02M 35/02416 55/497 |
| 2015/0075127 A1* | 3/2015 | Schmid | F02M 35/02416 55/502 |
| 2015/0090653 A1* | 4/2015 | Kotale | B01D 35/30 210/236 |
| 2015/0167602 A1* | 6/2015 | Waltenberg | B01D 46/0004 55/501 |
| 2015/0176544 A1* | 6/2015 | Kaufmann | F02M 35/02416 55/425 |
| 2015/0204282 A1* | 7/2015 | Merritt | B01D 46/0023 55/482 |
| 2016/0101380 A1* | 4/2016 | Pereira Madeira | B01D 46/0041 55/503 |
| 2016/0115917 A1* | 4/2016 | Sorger | B01D 46/0005 55/481 |
| 2016/0129384 A1* | 5/2016 | Schulz | B01D 29/213 55/482 |
| 2016/0131093 A1* | 5/2016 | Moon | F02M 35/02416 55/385.3 |
| 2016/0131094 A1* | 5/2016 | Pereira Madeira | F02M 35/02425 96/414 |
| 2016/0144310 A1* | 5/2016 | Movia | B01D 46/2414 55/478 |

* cited by examiner

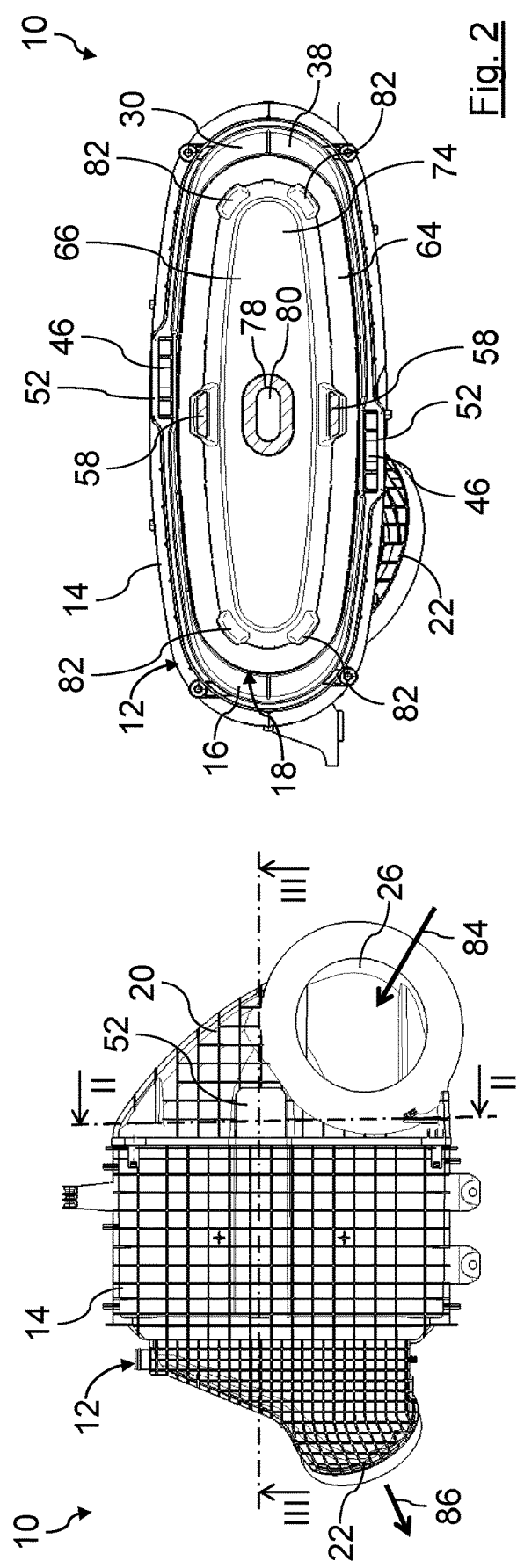

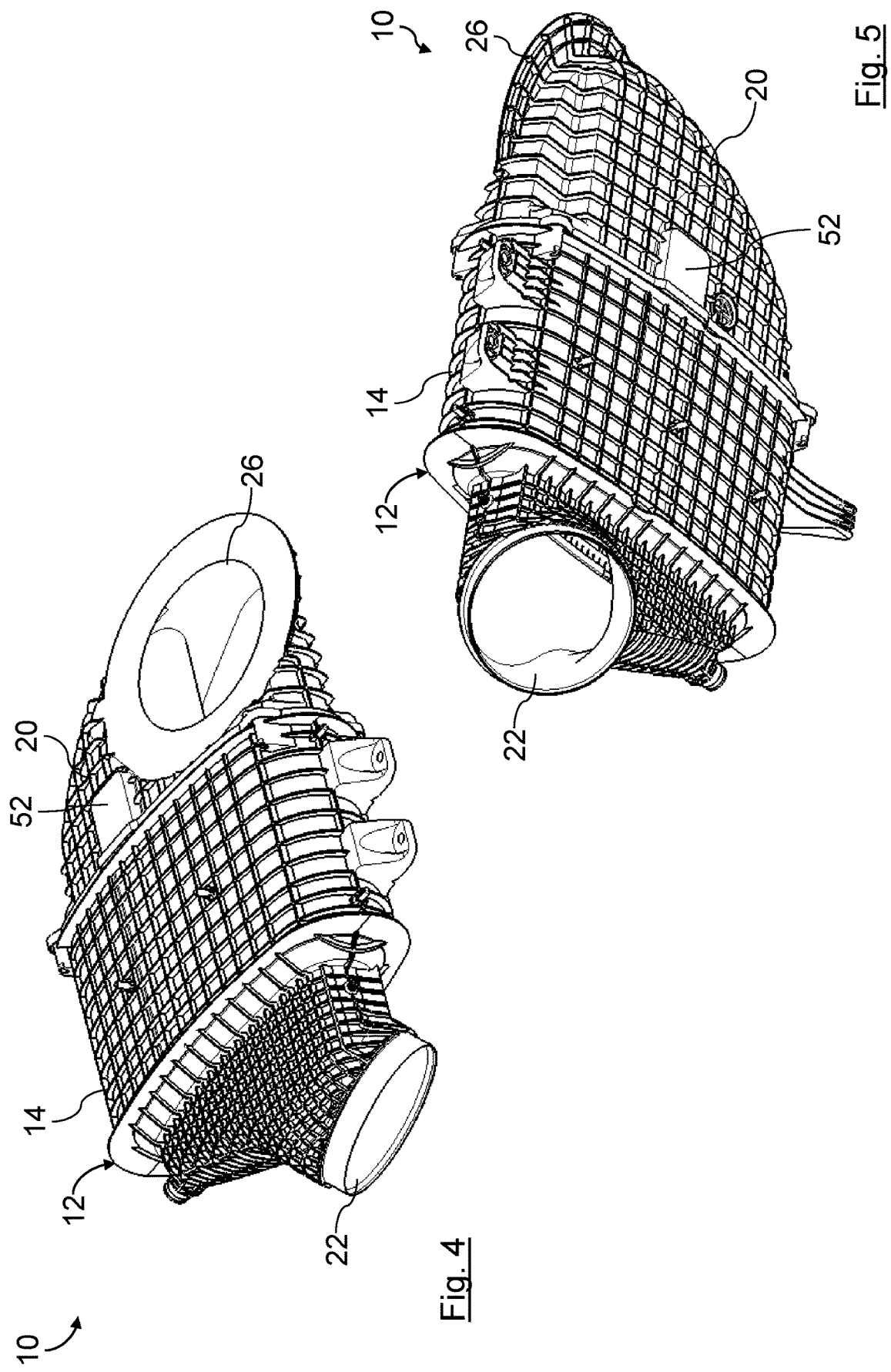

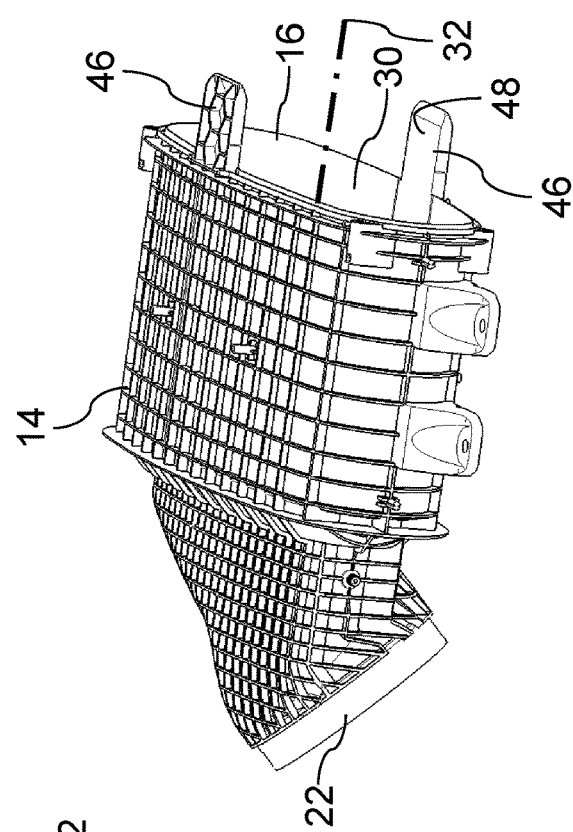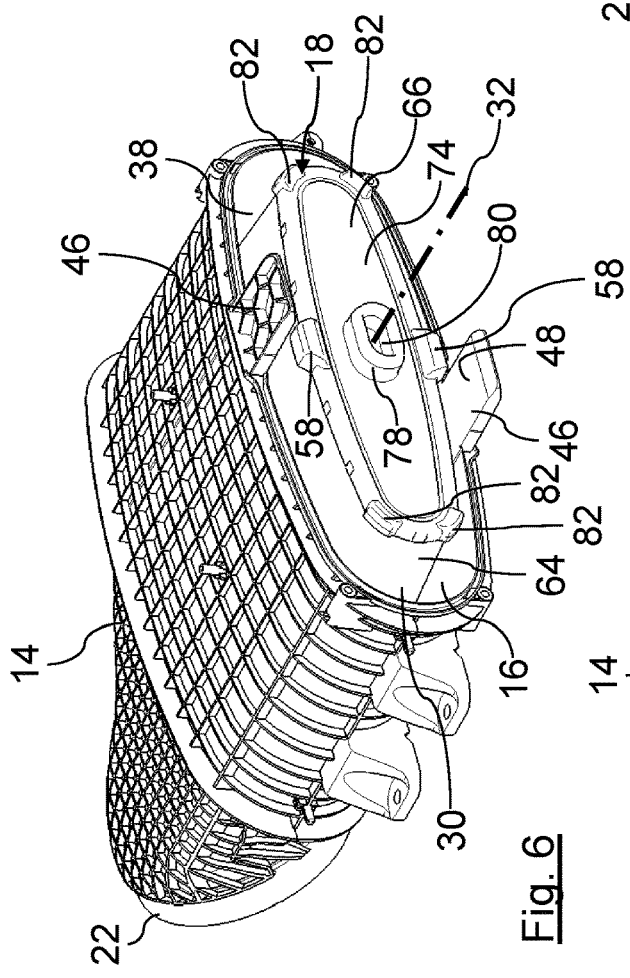

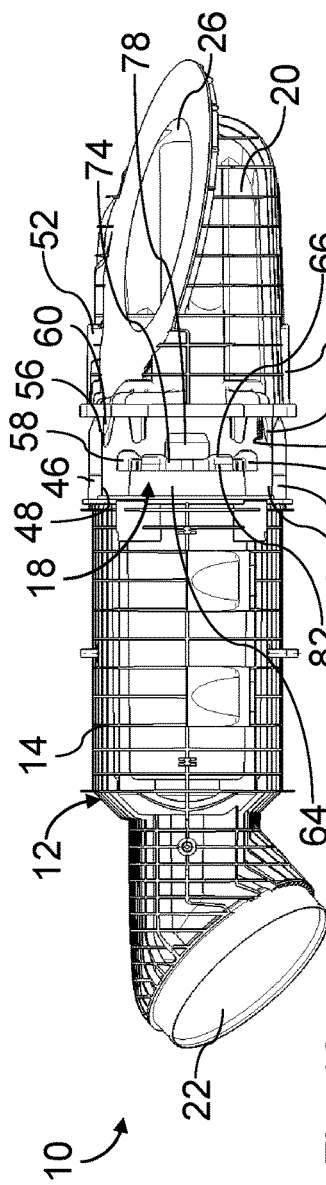
Fig. 12
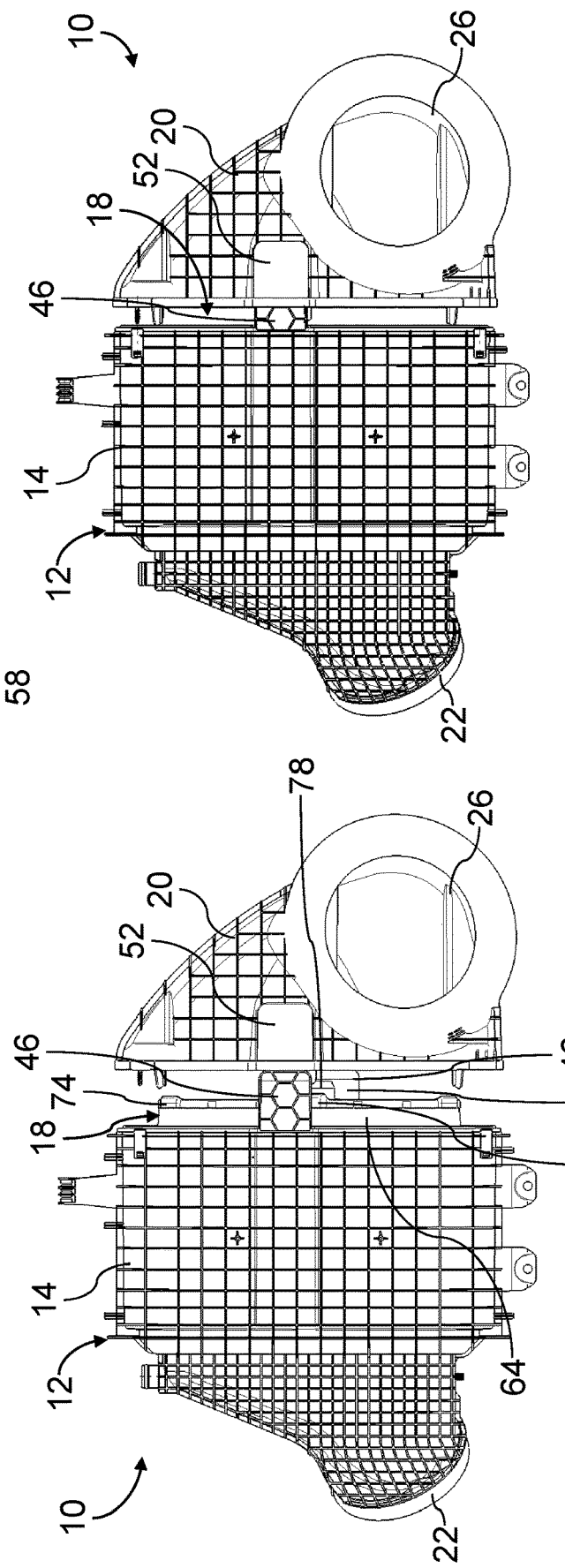
Fig. 13
Fig. 14

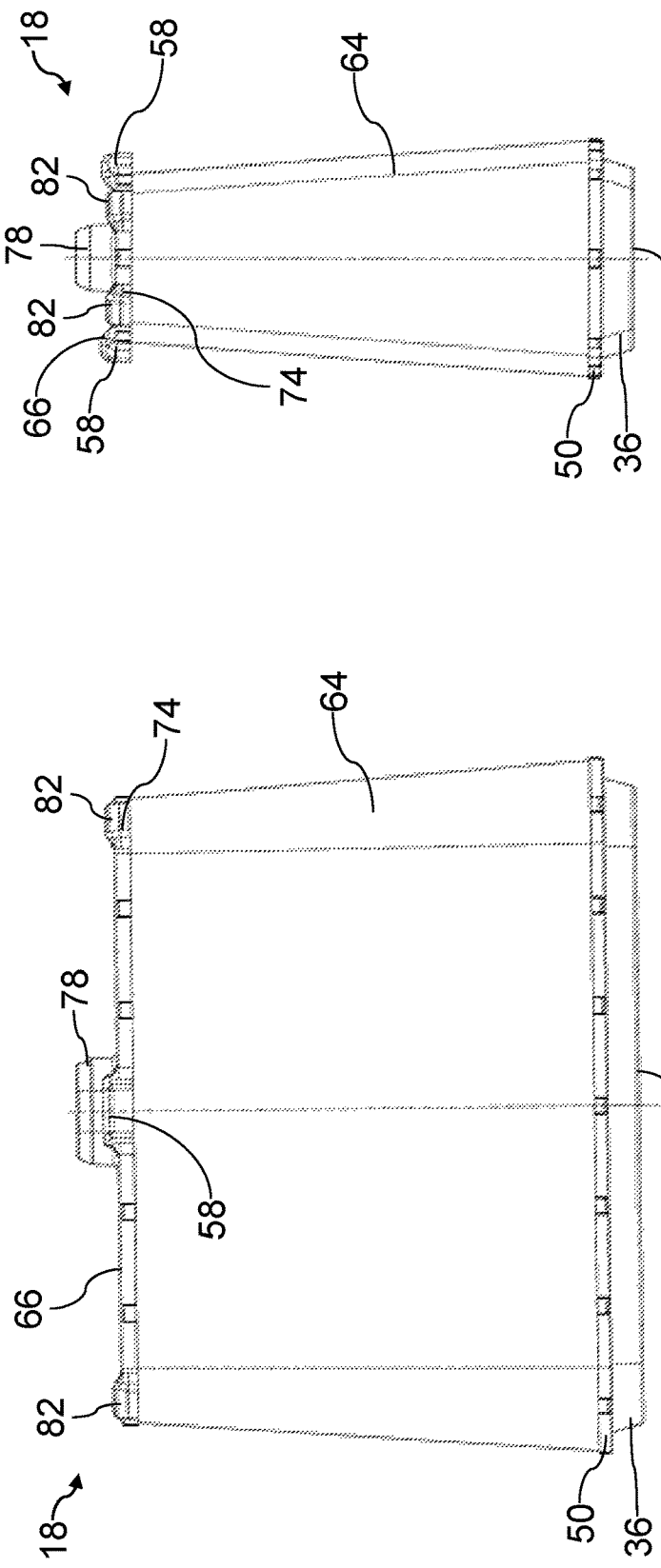

HOLLOW FILTER ELEMENT, FILTER HOUSING, AND FILTER

TECHNICAL FIELD

The invention relates to a hollow filter element, particularly a conical and/or oval rounded filter element, of a filter for fluid, particularly air, water, fuel, oil, or urea-water solution, particularly of an air filter, particularly of an internal combustion engine, particularly of a motor vehicle, particularly of a utility vehicle, comprising a filter medium for filtering the fluid, which filter medium surrounds an element interior space peripherally with respect to an element axis, the extent of which filter medium at least in one direction radial to the element axis is smaller on a first of the end sides of the filter medium than on a second of the end sides of the filter medium, and which filter medium has a first end body at least on the smaller end side.

Furthermore, the invention relates to a filter housing of a filter for fluid, particularly air, water, fuel, oil, or urea-water solution, particularly of an air filter, particularly of an internal combustion engine, particularly of a motor vehicle, particularly of a utility vehicle, comprising an openable filter housing, which has at least one inlet for fluid to be cleaned and at least one outlet for cleaned fluid and in which a hollow filter element having a filter medium for filtering the fluid, which filter medium surrounds an element interior space with respect to a filter axis, particularly an element axis, can be arranged in such a way that the hollow filter element can be exchanged and that the hollow filter element separates the at least one inlet from the at least one outlet.

In addition, the invention relates to a filter for fluid, particularly air, water, fuel, oil, or urea-water solution, particularly an air filter, particularly of an internal combustion engine, particularly of a motor vehicle, particularly of a utility vehicle, comprising an openable filter housing, in which a hollow filter element is arranged.

BACKGROUND OF THE INVENTION

An air intake system, comprising a housing having a raw-air inlet and a clean-air outlet, is known from DE 10 2010 049 411 A1. A filter element is arranged in the housing between the raw-air inlet and the clean-air outlet. The filter element comprises a filter medium, particularly in the form of a bellows, for cleaning raw air, and a center tube for supporting the filter medium. The filter element has an inflow protection means for deflecting flow in an inflow region of the filter medium and has an end plate. The inflow protection means and preferably also the center tube and the filter medium of one end are embedded in the end plate.

The problem addressed by the invention is that of designing a hollow filter element, a filter housing, and a filter of the type mentioned at the beginning, wherein the positioning and/or retention of the filter element in the filter housing can be improved, particularly simplified. In particular, a process of installing the hollow filter element into the filter housing should be simplified.

DISCLOSURE OF THE INVENTION

This problem is solved according to the invention in that the first end body has at least one leveling element in the at least one direction of the smaller extent with respect to the element axis in a radially outer segment with respect to the element axis.

The hollow filter element is provided with a filter medium for filtering the fluid, which filter medium surrounds an element interior space peripherally with respect to an element axis. The hollow filter element is preferably intended as an exchangeable filter element of a filter for fluid, particularly air, water, fuel, oil, or urea-water solution, particularly of an air filter, particularly of an internal combustion engine, particularly of a motor vehicle, particularly of a utility vehicle. The extent of the element interior space at least in one direction radial to the element axis is preferably smaller on a first of the end sides of the hollow filter element than on a second of the end sides of the hollow filter element. The hollow filter element preferably has a first end body at least one the smaller end side, which first end body has at least one leveling element in the at least one direction of the smaller extent with respect to the element axis in a radially outer segment with respect to the element axis.

According to the invention, at least one leveling element is provided, by means of which different distances of edges of the hollow filter element radial to the element axis on the differently sized end sides of the hollow filter element can be compensated. By means of the at least one leveling element, a height compensation can be achieved. The hollow filter element can thus be oriented in the filter housing. Particularly in the case of a horizontal arrangement of the hollow filter element, in which arrangement the element axis extends horizontally, different heights on the differently sized end sides can be compensated in this way.

Furthermore, the at least one leveling element can serve as a positioning aid during the assembly of the filter, particularly during the installation of the hollow filter element into the filter housing and/or during the closing of the filter housing. By means of the at least one leveling element, the smaller end side can be centered, particularly raised, in accordance with the larger end side. For this purpose, the filter housing can have at least one guide segment, particularly at least one guide track, which interacts with the at least one leveling element. By means of the at least one guide segment, the at least one leveling element can be guided and/or positioned during the assembly of the filter.

The at least one leveling element can advantageously have no sealing function. In this way, the retaining, positioning, leveling, and guiding functions can be separated from a sealing function and can each be optimized. A corresponding sealing function can be associated with at least one other part separate from the at least one leveling element and optimized separately.

The at least one leveling element can advantageously be firmly connected to the first end body. The at least one leveling element can advantageously be integrally connected to the first end body. Alternatively, the at least one leveling element can be, in particular, adhesively bonded or welded to or foamed onto the end body or firmly connected to the end body in another way as a separate part. The at least one leveling element can also be mechanically connected to the end body, particularly by means of a latching connection or a snap-in connection or in another way. The at least one leveling element can be connected to the end body detachably or permanently.

The at least one leveling element can advantageously be composed of a plastic, particularly polyurethane (PUR). Polyurethane can be connected to the first end body directly or indirectly in a simple manner. The at least one leveling element can advantageously be foamed onto the end body. Alternatively, the at least one leveling element can be foamed onto the filter medium together with the end body.

The at least one leveling element can advantageously be at least partially elastic. In this way, the hollow filter element can be fastened in the filter housing more simply. The at least one leveling element can yield and be pressed during the assembly of the filter. Any tolerances of the hollow filter element, particularly those resulting from production and/or parts and/or assembly and/or operation, can be compensated in the filter housing in a simple manner by means of the at least one leveling element. Furthermore, the at least one leveling element can additionally serve as a vibration damper, particularly during the operation of the air filter.

Alternatively or additionally, the at least one leveling element can advantageously be at least partially rigid. This can result in advantages during the assembly of the filter. By means of a rigid leveling element, more accurate and simpler guidance on a corresponding housing-side guide segment can occur.

The leveling element can advantageously serve as a spacer. Advantageously, a distance radial to the element axis between the radially outer peripheral side of the first end body and a corresponding opposite segment of the filter housing can be realized by means of the at least one leveling element. A gap can thus be realized between the filter element in the region of the smaller end side and an inner wall of the filter housing, said inner wall surrounding the filter element radially outside. Through the gap, fluid can enter a space surrounding the filter medium radially outside or exit said space. Fluid can thus flow, particularly axially to the element axis, from an inlet space segment of the filter housing to the inflow side of the filter medium. In the case of the direction of flow through the filter medium from radially outside to radially inside, the inflow side of the filter medium is located on the radially outer peripheral side of the filter element. The outflow side of the filter element is then located in the element interior space. The fluid stream can flow axially to the element axis from the outflow side of the filter medium into a corresponding outlet space segment of the filter housing. By means of the axial fluid stream, an improved package size of the filter housing and thus a smaller required space can be realized. Furthermore, in the case of an axial fluid flow toward the inflow side and/or away from the outflow side, a pressure difference between the inflow side and the outflow side can be reduced. In particular, a smaller pressure difference can thus be realized than in the case of a comparable filter in which the fluid stream is tangentially fed to the inflow side of the filter element or led away from the outflow side.

The element axis can advantageously be oriented parallel, particularly coaxially, to a housing axis by means of the at least one leveling element. In this way, the filter as a whole can be coaxially constructed. The space required by the filter can thus be reduced.

The element axis and/or the housing axis can advantageously extend parallel or coaxially to each other. Advantageously, the element axis and/or the housing axis can extend parallel or coaxially to an installation axis of the installation of the filter element into the filter housing. The filter element can thus be inserted into the filter housing in the axial direction in a simple manner. In particular, the filter element can be inserted into a corresponding housing piece, particularly a housing pot, of the filter housing in the axial direction. Advantageously, an assembly axis, in which the two housing pieces are assembled or separated, can extend parallel or coaxially to the element axis and/or to the housing axis and/or to the installation axis. Advantageously, one of the housing pieces, particularly a housing cover, can be placed onto the filter element and placed onto or inserted into the other housing piece in the axial direction.

The first end body can advantageously be or comprise an end plate.

The filter medium can be stabilized by means of the first end body. Furthermore, the filter medium can be sealed on the smaller end side by means of the first end body.

The first end body can advantageously be composed of plastic. The first end body can advantageously be adhesively bonded, welded, or tightly connected in another way to the end side of the filter medium. The material of which the end body is composed can advantageously also be foamed onto or into the end side of the filter medium.

Advantageously, the element interior space can be closed by means of the first end body on the small end side of the filter element. In this way, a flow of fluid out of the element interior space or into the element interior space can be prevented there. It can thus be achieved that the fluid must flow through the filter medium. The fluid can enter the element interior space from radially outside to radially inside or exit the element interior space in the reverse direction. The fluid can flow into the element interior space or out of the element interior space through a corresponding flow opening on the other end side of the filter element.

Advantageously, the at least one leveling element can be arranged on a raw-fluid side of the hollow filter element. Alternatively or additionally, at least one leveling element can be arranged on a clean-fluid side of the hollow filter element.

Advantageously, the first end body can face an inlet space segment of the filter housing for fluid to be cleaned. The inlet space segment can advantageously be connected to at least one inlet of the filter housing.

The hollow filter element can advantageously be a rounded filter element having a round cross-section, an oval rounded filter element having an oval cross-section, a flat-oval rounded filter element having a flattened oval cross-section, a conical rounded filter element, wherein the round cross-section is tapered in the axial direction with respect to the element axis, a conical-oval rounded filter element, wherein the oval cross-section is tapered at least in the direction of one transverse axis in the axial direction with respect to the element axis, a conical flat-oval rounded filter element, wherein the flat-oval cross-section is tapered at least in the direction of one transverse axis in the axial direction with respect to the element axis, or a hollow filter element having cross-section of a different type, particularly an angular cross-section, and/or a cross-section variation of a different type in the direction of the element axis.

The at least one leveling element can advantageously be arranged on a long, particularly flat, side of an oval, particularly flat-oval, rounded filter element.

The at least one leveling element can advantageously be arranged on the tapered end side of a conical, particularly conical-oval or flat conical-oval, rounded filter element.

The filter medium can advantageously be folded in a peripherally closed manner, particularly in a star shape, particularly in a zig-zag shape or wave shape. The filter medium can also be peripherally closed in an unfolded manner. The filter medium can be shaped into a filter bellows.

The filter medium can be filter paper, filter nonwoven, or a filter medium of a different type that is suitable for filtering the fluid, particularly air. The filter medium can be composed of one or more layers.

Advantageously, the filter medium can have a second end body, particularly an end plate, on the larger end side of the filter medium. The second end body can advantageously be composed of a material similar to or different from that of the first end body. The second end body can advantageously be connected to the filter medium in a manner similar to or different from that of the first end body. Advantageously, the second end body can have a passage opening for the fluid.

Advantageously, at least one seal can be arranged on the larger end side. The at least one seal can be fastened to the second end body. The at least one seal can advantageously be connected to the second end body integrally or as a two-component part or as a separate part. A raw-fluid side of the hollow filter element can be separated from a clean-fluid side by means of the at least one seal. The at least one seal can advantageously seal against at least one corresponding sealing surface of the filter housing axially and/or radially to the element axis. The at least one housing-side sealing surface can advantageously be arranged on/in the housing pot of the filter housing.

The at least one seal can also have a supporting function. Advantageously, the filter medium can be supported against the filter housing in the axial and/or radial direction by means of the at least one seal. The at least one seal can possibly serve as a counter bearing for at least one axially opposite supporting element of the of the hollow filter element in the axial direction. The hollow filter element can thus be axially clamped between the at least one seal and the at least one supporting element.

Advantageously, the at least one seal can be composed of an elastic material, particularly polyurethane, particularly a polyurethane foam, or comprise such a material.

The filter element can advantageously comprise a supporting body, particularly a supporting tube. The supporting body can advantageously be located in the element interior space. A supporting body that surrounds the filter medium radially outside can also be provided. A peripheral wall of the supporting body can advantageously be permeable to the fluid. The peripheral wall can advantageously be skeletal or latticed. The supporting body can advantageously be composed of plastic. The filter medium can advantageously be supported on the supporting body.

The filter can advantageously be an air filter. The air filter can advantageously be part of an air intake tract of an internal combustion engine. The air filter can be used to clean combustion air, which is fed to the internal combustion engine.

However, the invention is not restricted to an air filter of an air intake tract of an internal combustion engine of a motor vehicle, particularly of a truck. Rather, the invention can also be used for motor vehicle air systems of different types. Advantageously, the air filter can also be a cabin filter. The filter, particularly air filter, can also be used outside the automotive field, particularly in the field of industrial engines. Advantageously, the filter can be part of a utility power machine, particularly of a construction machine or of a utility automobile, particularly of a utility vehicle, particularly of a truck, of a bus, of a construction machine, or of an agricultural machine.

The invention can also be used for exhaust gas cleaning for internal combustion engines or combustion machines.

In an advantageous embodiment, the first end body can have a leveling element on each of peripheral sides that are diagonally opposite in the at least one direction of the smaller extent with respect to the element axis.

In this way, the first end body can be supported against the filter housing on opposite sides. More even and/or more precise guidance/positioning/retention in the filter housing can thus occur.

In a further advantageous embodiment, a base area of the hollow filter element can be elongate, particularly oval, at least in the region of the smaller end side, and an imaginary center point of the at least one leveling element can be located on a minor axis of an imaginary plane that extends parallel to the base area of the hollow filter element. The center points of the opposite leveling elements possibly can each be located on the minor axis.

In this way, the first end plate can be supported approximately centrally on corresponding long sides of the first end plate. Support and/or guidance can thus be improved.

The minor axis is the short axis of the elongate area through the center of the elongate area. In contrast thereto, the major axis is the long axis of the elongate area through the center of the elongate area.

In a further advantageous embodiment, the at least one leveling element can extend outward beyond the radially outer peripheral side of the filter medium at least radially, particularly radially and axially.

The at least one leveling element can thus enable radial support. A distance between a radially outer peripheral side of the filter medium and a corresponding peripheral side of the filter housing can be achieved by means of the at least one leveling element.

If the at least one leveling element protrudes beyond the filter medium additionally in the axial direction, axial support can additionally occur. In this way, tipping or tilting of the at least one end body in relation to the element axis can be counteracted.

In a further advantageous embodiment, a distance of a radially outer peripheral side of the at least one leveling element from the element axis can correspond approximately to a distance of the corresponding radially outer peripheral side of the hollow filter element from the element axis on the larger end side.

In this way, the hollow filter element can be oriented with the element axis thereof evenly parallel or coaxial to the housing axis.

Alternatively or additionally, a distance of the radially outer peripheral side of the at least one leveling element from the element axis can advantageously be larger than a corresponding distance of the radially outer peripheral side of the hollow filter element, particularly of an end body there, on the larger end side. In this way, different diameters of the filter housing at the end sides of the hollow filter element can be compensated.

In a further advantageous embodiment, the at least one leveling element can be arranged spatially at the bottom in the final installation position of the hollow filter element in a filter housing of the filter in the typical operating position of the filter housing.

Advantageously, the at least one direction of the smaller extent can extend spatially vertically in the final installation position in the typical operating position. Advantageously, the element axis can extend spatially horizontally in the installation position in the typical operating position.

In a further advantageous embodiment, the hollow filter element can have at least one supporting element on an outer face on the smaller end side, which outer face faces away from the element interior space.

The at least one supporting element and thus the hollow filter element can be supported at least transversely to the element axis, particularly radially or tangentially to the element axis or radially to another axis that is parallel to the element axis. In this way, the hollow filter element can be additionally position and retained in the radial direction with respect to the element axis.

Advantageously, the at least one supporting element can be arranged on a raw-fluid side of the hollow filter element. Alternatively or additionally, at least one supporting element can be arranged on a clean-fluid side.

Advantageously, the at least one supporting element can be supported in the filter housing additionally in the axial direction with respect to the element axis. In this way, the axial position of the hollow filter element can also be improved. The hollow filter element can advantageously be clamped and retained between two opposite supporting segments of the filter housing in the axial direction.

Advantageously, at least one supporting element can be arranged centrally with respect to the element axis on the smaller end side of the hollow filter element. The hollow filter element can thus be centrally supported. In this way, improved support of the hollow filter element on the filter housing can occur even by means of only one supporting element and only one corresponding supporting segment. The support can thus be realized with a small required space of the parts required therefor in the filter housing.

Advantageously, the at least one supporting element can be at least partially elastic. In this way, any installation tolerances of the hollow filter element in the filter housing can be compensated in a simple manner by means of the at least one supporting element. Furthermore, the at least one supporting element can additionally serve as a vibration damper, particularly during the operation of the filter. Advantageously, the at least one supporting element can be composed of an elastic plastic, particularly polyurethane (PUR). Polyurethane can be connected to the end body in a simple manner. The at least one supporting element can advantageously be foamed onto the end body.

The at least one supporting element can have at least one cylindrical and/or at least one conical segment. A main axis of the at least one supporting element can extend axially or parallel to the element axis. The supporting element can be supported against at least one corresponding supporting segment on the side of the filter housing transversely and/or axially and/or parallel to the element axis.

The at least one supporting element can advantageously have an oval, flat-oval, or round base area. The at least one supporting element can also have a base area of a different type, particularly an angular base area.

Advantageously, the at least one supporting element can have a hollow cylindrical or sleeve-like segment.

The at least one supporting element can have a cavity that is open to the at least one supporting segment of the filter housing. A corresponding projection of the at least one supporting segment extends into the cavity. In this way, the support can be improved.

The hollow cylindrical or sleeve-like segment of the at least one supporting element can advantageously be inserted into a corresponding end-side groove, particularly a counter supporting groove, of the at least one supporting segment when the hollow filter element is in the correctly mounted state. The groove can be regarded as a cavity of the supporting segment, which cavity is open toward the free end side of the supporting segment.

Advantageously, the at least one supporting element can be arranged on the first end body of the hollow filter element.

The at least one supporting element can advantageously be firmly connected to the first end body. The at least one supporting element can be, in particular, adhesively bonded or welded to or foamed onto the end body or firmly connected to the end body in another way as a separate part. The at least one supporting element can also be mechanically connected to the end body, particularly by means of a latching connection or a snap-in connection or in another way. The at least one supporting element can be connected to the end body detachably or permanently.

Advantageously, the at least one supporting element can be located on the raw-fluid side of the filter medium. Alternatively or additionally, at least one supporting element can be located on the clean-fluid side of the filter medium.

The technical problem is further solved in the case of the filter housing in that a housing pot of the filter housing has an installation opening for the hollow filter element, which installation opening is crossed by the filter axis in the installed state of the hollow filter element, particularly is coaxial to the filter axis, and which installation opening is at least as large as the greatest outside dimension of the hollow filter element radial to the filter axis, and a housing cover has at least one guide track for guiding and supporting at least one leveling element arranged on a first end body of the hollow filter element radially outside with respect to the filter axis, said guide track extending at least by means of at least one imaginary main guide line in a plane having an installation axis of the installation of the hollow filter element into the housing cover.

The advantages and features presented above in connection with the hollow filter element according to the invention and the advantageous embodiments thereof apply accordingly to the filter housing according to the invention and the advantageous embodiments thereof and vice versa.

The hollow filter element can be inserted into the housing pot in the direction of the installation axis through the installation opening. Advantageously, the installation axis can be parallel or coaxial to the element axis.

Advantageously, the hollow filter element can have different extents radial to the element axis on the two end sides of the hollow filter element. Advantageously, the hollow filter element can be inserted into the housing pot with the larger end side first. A size difference between the installation opening and the smaller end side of the hollow filter element can be compensated by means of the at least one leveling element.

As the housing cover is placed onto the housing pot and thus onto the hollow filter element, the at least one main guide line can specify a path of a contact point or contact region of the leveling element during the sliding on the guide track.

Advantageously, the housing pot and the housing cover can be completely or partially separated from each other in order to open the filter housing. The hollow filter element can be housed in the housing pot. The housing pot can advantageously be coaxial to the housing axis.

The installation opening for the hollow filter element can advantageously be coaxial to the housing axis. The filter element can thus be installed in the housing pot through the installation opening in the axial direction with respect to the housing axis in a simple manner. The installation opening of the housing pot and thus the filter housing can be closed by means of the housing cover.

The at least one inlet and the at least one outlet can be located in the same or different housing pieces, thus in the housing pot and/or the housing cover.

In an advantageous embodiment, the at least one guide track can extend into a region outside of an interior space of the housing cover.

Advantageously, at least one guide arm can be provided, on which at least one guide track can be realized.

The at least one guide arm can advantageously protrude from the interior space of the housing cover. In this way, the corresponding at least one leveling element can be guided on the at least one guide arm before the hollow filter element enters the housing cover.

The interior space of the housing cover can advantageously at least contribute to the formation an inlet space segment for letting in the fluid.

Advantageously, the at least one guide arm can be beveled outside the housing cover on a peripheral side facing the housing axis. The beveled peripheral side contributes to the formation of the at least one guide track.

As viewed in the direction of the housing axis toward the interior space of the housing cover, the at least one guide track can thus run toward the housing axis. In this way, the insertion of the at least one leveling element can be simplified.

In a further advantageous embodiment, at least two guide tracks can be located on diagonally opposite radially inner peripheral sides of the housing cover with respect to the element axis.

In this way, the hollow filter element can be evenly guided, centered, and/or retained in the filter housing by means of correspondingly opposite leveling elements.

In a further advantageous embodiment, the housing pot and/or the housing cover can have at least one connecting tab for connecting to the other part of the filter housing.

Advantageously, the corresponding other housing piece, namely the housing cover and/or the housing pot, can have at least one tab receptacle that matches the at least one connecting tab. The at least one connecting tab can be inserted into the at least one tab receptacle in order to connect the housing cover to the housing pot.

The at least one connecting tab can advantageously be tapered toward the free edge thereof, particularly in a wedge-like manner. An insertion of the connecting tab into the corresponding tab receptacle can thus be simplified.

The at least one tab receptacle can advantageously be a recess that is closed peripherally with respect to the axis thereof. In this way, the at least one connecting tab can be retained in the at least one tab receptacle on all peripheral sides.

The at least one tab receptacle can advantageously have, on the side thereof facing the other housing piece, a corresponding insertion opening for the at least one connecting tab.

The at least one tab receptacle can advantageously be integrated in a peripheral wall of the corresponding housing piece.

Advantageously, the at least one connecting tab and/or the at least one tab receptacle can extend parallel or axially to an assembly axis of the assembly of the housing cover with the housing pot. In this way, the at least one connecting tab can be inserted into the at least one tab receptacle during the mounting of the housing cover on and/or in the housing pot. By means of the interaction of the at least one connecting tab with the at least one tab receptacle, the housing pot and the housing cover can be pre-adjusted during the assembly. In this way, the assembly can be made easier. The at least one connecting tab and the at least one tab receptacle can interact as a guiding aid during the mounting of the housing cover. Furthermore, tolerances resulting from parts and/or assembly and/or operation can be compensated by means of the at least one connecting tab and the at least one tab receptacle. When the housing cover is in the mounted state, the at least one connecting tab can improve mechanical stabilization of at least one corresponding peripheral-wall segment of the housing cover and/or of the housing pot. The at least one connecting tab can support the at least one peripheral-wall segment radially to the element axis and/or to the housing axis. By means of the interaction of the at least one connecting tab with the at least one tab receptacle, the tightness of the connection of the housing cover to the housing pot can be improved. Guidance of the hollow filter element in the housing cover and/or in the housing pot during the attachment of the housing cover can be made more precise.

Advantageously, the at least one connecting tab can arranged on the same peripheral side of the filter housing as the at least one leveling element when the housing cover is in the mounted state. In this way, the at least one leveling element can press against the at least one peripheral-wall segment of the housing cover and/or of the housing pot from the inside and the at least one connecting tab and/or the corresponding tab receptacle can counter from outside.

Advantageously, when the housing is in the assembled state, the at least one connecting tab can be arranged on the same peripheral side of the filter housing as possibly the at least one guide track for the at least one leveling element.

Advantageously, the at least one guide track can be arranged between the at least one leveling element and the at least one connecting tab/tab receptacle radially with respect to the element axis. In this way, the at least one guide track can be supported against a pressure of the at least one leveling element by means of the at least one connecting tab/tab receptacle.

The connecting tabs/tab receptacles and the corresponding leveling elements/guide tracks can advantageously be arranged peripherally offset from each other.

In a further advantageous embodiment, a base area of the installation opening can be elongate, particularly oval, and the main guide line of the at least one guide track can be located in a minor plane having a minor axis of the base area of the installation opening and having the installation axis. The main guide lines of the opposite guide tracks can possibly each be located in the minor plane.

In this way, the support and guidance can occur by means of the at least one leveling element on the at least one guide track on a long side of the filter housing. The guidance and/or positioning can thus be further improved.

In a further advantageous embodiment, at least one supporting segment can be arranged centrally in/on the filter housing with respect to a housing axis, which can coincide with the element axis when the hollow filter element is in the installed state.

Advantageously, the at least one supporting segment can interact with at least one supporting element of the hollow filter element when the filter is in the assembled state. The positioning of the hollowing filter element and/or the assembly of the at least one supporting element with the at least one supporting segment can thus be simplified.

Advantageously, the at least one supporting segment can be located on the housing cover. In this way, the at least one supporting segment and the at least one supporting element can be brought together after the installation of the hollow filter element into the housing pot. The assembly of the filter can thus be simplified.

Advantageously, the at least one supporting segment can be arranged on a raw-fluid side of the hollow filter element.

Advantageously, the hollow filter element can be supported on the other housing piece on the end side opposite the at least one supporting element.

Advantageously, the at least one supporting element and the at least one supporting segment can have no sealing function. In this way, the supporting function can be separated from each other and optimized. A corresponding sealing function can be associated with at least one other part pair separate from the at least one supporting element and from the at least one supporting segment and optimized separately.

Advantageously, the at least one supporting segment can have at least one cylindrical and/or at least one conical segment. A main axis of the supporting segment, particularly of the cylindrical/conical segment, can advantageously extend axially or parallel to the housing axis. In this way, the at least one supporting segment and the at least one supporting element can have the same orientation when the hollow filter element is in the installed state.

Advantageously, the main axes of the at least one supporting element and of the at least one supporting segment can extend coaxially when the hollow filter element is in the mounted state. In this way, the at least supporting element can be placed onto and/or the supporting segment in a simple manner. Advantageously, the main axes of the at least one supporting element and of the at least one supporting segment can extend parallel or axially to an assembly axis of the filter element in relation to the filter housing, particularly to the housing piece having the at least one supporting segment, when the hollow filter element is in the installed state. The at least one supporting element and the at least one supporting segment can thus be automatically brought into relation in a simple manner during the mounting of the filter element in the filter housing, particularly during the assembly of the filter housing. Advantageously, the at least one supporting element can thus be brought into relation with the at least one supporting segment in a simple manner during the attachment of the housing cover to the housing pot.

Advantageously, the at least one supporting element can be complementary to the at least one supporting segment at least in some segments. The at least one supporting element can thus lie against the at least one supporting segment nearly without play. In this way, reliable and stable support can occur transversely, particularly radially and/or tangentially, to the element axis and/or housing axis in a simple manner.

The at least one supporting segment can advantageously have an oval, flat-oval, or round base area. The at least one supporting segment can also have a base area of a different type, particularly an angular base area.

Advantageously, the at least one supporting segment can have an end-side groove, particularly a counter supporting groove, which extends peripherally with respect to the main axis of the at least one supporting segment. The groove can advantageously be located on an end side of the at least one supporting segment facing the hollow filter element.

Alternatively or additionally, the at least one supporting segment can advantageously have a hollow cylindrical or sleeve-like segment.

Advantageously, the at least one supporting segment can be, comprise, or be part of a type of pillar or dome. The at least one supporting element of the hollow filter element can be supported on the free end of the pillar or dome. By means of the other end, the pillar or dome can be connected to the filter housing, particularly the housing cover. In particular, the pillar or dome can be integrally connected to the filter housing.

The pillar or dome can advantageously extend through a space segment of the filter housing. In this way, the hollow filter element can be supported at a distance from a corresponding housing wall of the filter housing, which distance is bridged by the pillar or dome. Advantageously, fluid can flow through the space segment during the operation of the filter. Depending on the direction of flow of the fluid in the filter housing, the space segment can be an inlet space segment or an outlet space segment.

In addition, in the case of the filter according to the invention, the technical problem is solved in that a hollow filter element according to the invention is arranged in the filter housing.

The advantages and features presented above in connection with the hollow filter element according to the invention and the filter housing according to the invention and the advantageous embodiments thereof apply accordingly to the filter according to the invention and the advantageous embodiments thereof.

Advantageously, the filter housing can be a filter housing according to the invention.

Advantageously, an inlet-side inlet space segment, an element space segment, in which the hollow filter element can be arranged, and an outlet-side outlet space segment of the filter housing can be arranged linearly and one behind the other along the flow path of the fluid through the filter. In this way, an axial inflow of the fluid to the inflow side of the filter medium can be realized in a simple manner. Furthermore, an axial outflow of the filtered fluid from the clean-fluid side of the hollow filter element can thus be achieved. Any pressure differences between the clean-fluid side and the raw-fluid side can thus be reduced. Advantageously, a main direction of flow of the fluid from the inlet space segment through the element space segment into the outlet space segment can be substantially axial to the element axis and/or to the housing axis.

BRIEF DESCRIPTION OF THE DRAWINGS

Further advantages, features, and details of the invention result from the following description, in which an embodiment example of the invention is explained in more detail on the basis of the drawing. A person skilled in the art will advantageously also consider individually the features disclosed in combination in the drawing, the description and the claims and combine the said features into sensible further combinations.

FIG. 1 schematically shows a top view of an air filter of an internal combustion engine having a filter housing assembled from a housing pot and from a housing cover, in which filter housing an exchangeable conical-oval rounded filter element is arranged;

FIG. 2 schematically shows a transverse-side section of the air filter from FIG. 1 along the section line II-II;

FIG. 3 schematically shows a longitudinal-side section of the air filter from FIG. 1 along the section line III-III;

FIG. 4 schematically shows a first isometric angled view of the air filter from FIGS. 1 to 3;

FIG. 5 schematically shows a second isometric angled view of the air filter from FIGS. 1 to 4;

FIG. 6 schematically shows an isometric illustration of the open housing pot of the air filter from FIGS. 1 to 5, with the rounded filter element;

FIG. 7 schematically shows an isometric illustration of the open housing pot of the air filter from FIGS. 1 to 6, here without the rounded filter element;

FIG. 8 schematically shows an isometric illustration of the open housing pot of the air filter from FIGS. 1 to 7, without the rounded filter element, from a different prospective;

FIG. 12 schematically shows a side view of the air filter from FIGS. 1 to 5 in an early mounting phase of the mounting of the housing cover onto the housing pot;

FIG. 13 schematically shows a top view of the air filter in the mounting phase from FIG. 12;

FIG. 14 schematically shows a top view of the air filter in a mounting phase following the mounting phase illustrated in FIG. 13;

FIG. 17 schematically shows a longitudinal-side side view of the rounded filter element of the air filter from FIGS. 1 to 5;

FIG. 18 schematically shows a transverse-side side view of the rounded filter element of the air filter from FIGS. 1 to 5;

FIG. 19 schematically shows a top view of an inlet-side end plate of the rounded filter element of the air filter from FIGS. 1 to 5.

In the figures, the same parts are provided with the same reference signs.

EMBODIMENT(S) OF THE INVENTION

Figure 9:
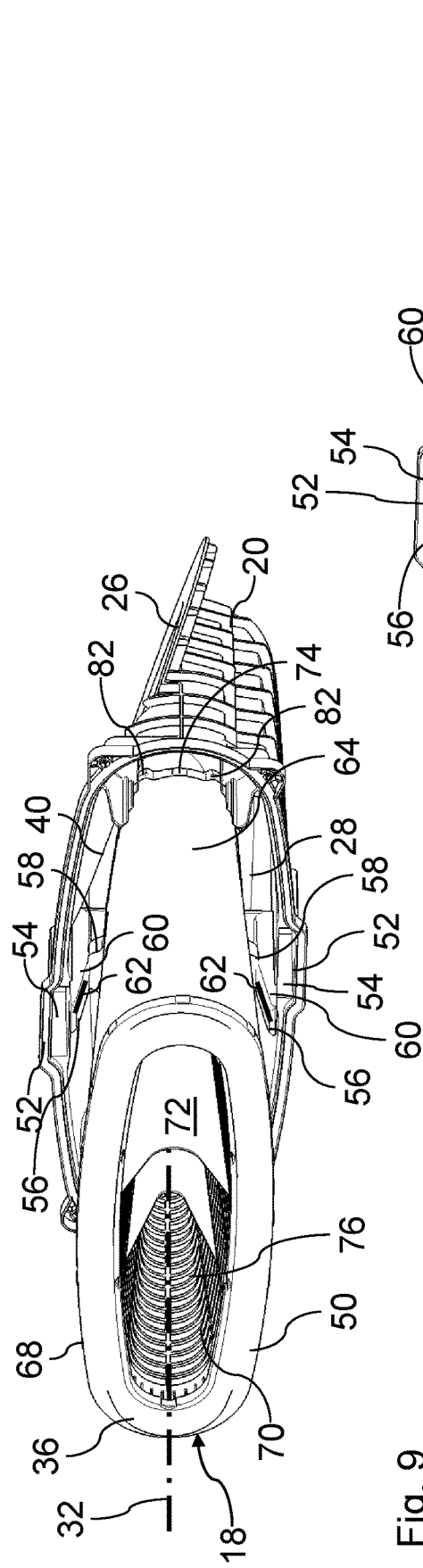
FIG. 9 schematically shows an isometric illustration of the housing cover of the air filter from FIGS. 1 to 5, with the rounded filter element and without the housing pot.

In FIGS. 1 to 14, an air filter 10 of an internal combustion engine of a utility vehicle is shown in different illustrations and assembly phases. The air filter 10 is arranged in an air intake tract of the internal combustion engine. The air filter 10 is used to clean combustion air, which is fed to the internal combustion engine for combustion.

The air filter 10 comprises an openable filter housing 12. The filter housing 12 is flat-oval. The filter housing 12 is flattened in the direction of the short transverse axis of the filter housing 12 in relation to an oval filter housing having an approximately elliptical cross-section. In FIG. 3, a section along a short transverse axis of the filter housing 12 is shown. The filter housing 12 has a housing pot 14, on the left in FIGS. 1 and 3. The housing pot 14 has an installation opening 16, which, for example in FIGS. 6 to 8, is shown in the foreground, for installing a filter element 18. The installation opening 16 is closed by means of a housing cover 20, on the right in FIG. 1.

The housing pot 14 has an outlet 22 for the filtered air, which outlet 22 leads into an outlet space segment 24 of the housing pot 14. The outlet 22 is connected to the internal combustion engine outside the filter housing 12 by means of air lines not shown.

The housing cover 20 has an inlet 26 for air to be filtered, which inlet 26 leads into an inlet space segment 28 of the housing cover 20 and is connected to the environment outside the filter housing 12. Alternatively, the inlet 26 can also be arranged in a side wall of the housing pot 14.

The filter element 18 is arranged in an element space segment 30 of the housing pot 14 in such a way that the filter element 18 separates the inlet 26 from the outlet 22. The element space segment 30 is located in a linear arrangement between the inlet space segment 28 and the outlet space segment 24.

The inlet space segment 28, the element space segment 30, and the outlet space segment 24 are arranged one behind the other axially to a filter axis 32. For better understandability, the filter axis 32 is shown in FIG. 3, although the filter axis 32 lies outside of section plane II-III from FIG. 1, namely in front of the drawing plane.

In the embodiment example shown, the filter axis 32 coincides with a housing axis of the filter housing 12 and, when the filter element 18 is in the installed state, coincides with an element axis of the filter element 18. In the present case, the filter axis 32 also coincides with an installation axis, along which the filter element 18 can be inserted into the housing pot 14 and removed from the housing pot 14. The filter axis 32 additionally coincides with an assembly axis, along which the housing cover 20 is mounted onto the housing pot 14. In the embodiment example explained in the description, the axes listed above are briefly referred to as the "filter axis 32" for better clarity and understandability. When the terms "axial/axially," "radial/radially," peripheral/peripherally," or "coaxial/coaxially" are used below, these terms relate to the filter axis 32, unless otherwise stated.

The installation opening 16 peripherally surrounds the filter axis 32. In the installed state of the filter element 18, the filter axis 32 crosses the installation opening 16. The inside dimension of the installation opening 16 is greater than the greatest outside dimension of the filter element 18 radial to the filter axis 32. A base area of the installation opening 16 is flat-oval in an elongate manner.

The housing pot 14 has a peripherally closed sealing surface 34 axially between the element space segment 30 and the outlet space segment 24. The sealing surface 34 extends in the radial direction. The sealing surface 34 faces the housing cover 20. A seal 36 of the filter element 18 lies tightly against the sealing surface 34 in a peripherally closed manner.

The radially inner cross-section of the element space segment 30 is larger than a radially outer cross-section of the sealing surface 34.

An inflow annular space 38 is realized between a radially outer peripheral side of the filter element 18 and the radially inner peripheral side of the element space segment 30. The inflow annular space 38 is separated from the outlet space segment 24 by means of the seal 36.

On the side facing the housing cover 20, the inflow annular space 38 is connected to the inlet space segment 28 by means of a peripheral gap 40. The inlet space segment 28 and the inflow annular segment 38 are located on the raw-air side of the filter element 18.

A supporting pillar 42 is arranged on the housing cover 20. The supporting pillar 42 is integrally connected to the housing cover 20. The supporting pillar 42 is approximately coaxial to the filter axis 32. The supporting pillar 42 is arranged centrally with respect to the filter axis 32. The supporting pillar 42 extends in the inlet space segment 28 from an inner face of the housing cover 20 facing the filter element 18 to an inlet-side end side 66 of the filter element 18. The supporting pillar 42 is located on the raw-air side of the filter medium 64.

Figure 10:
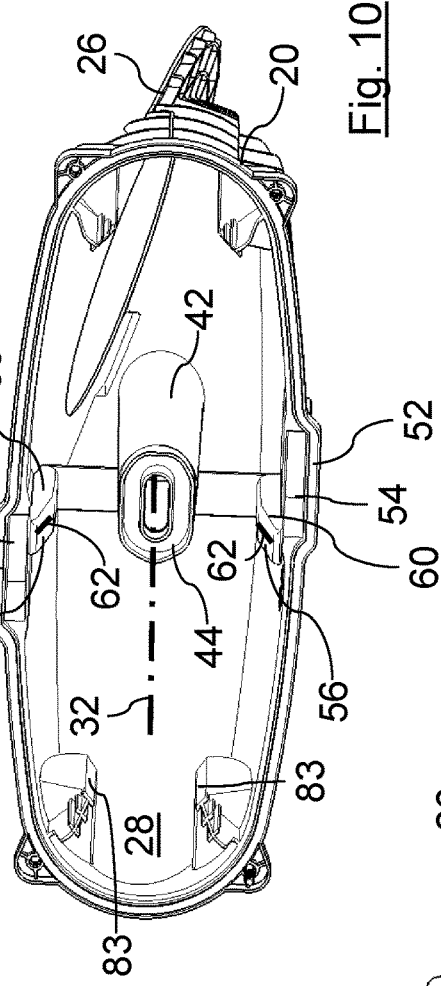
FIG. 10 schematically shows an isometric illustration of the housing cover of the air filter from FIGS. 1 to 5, without the rounded filter element.
Figure 11:
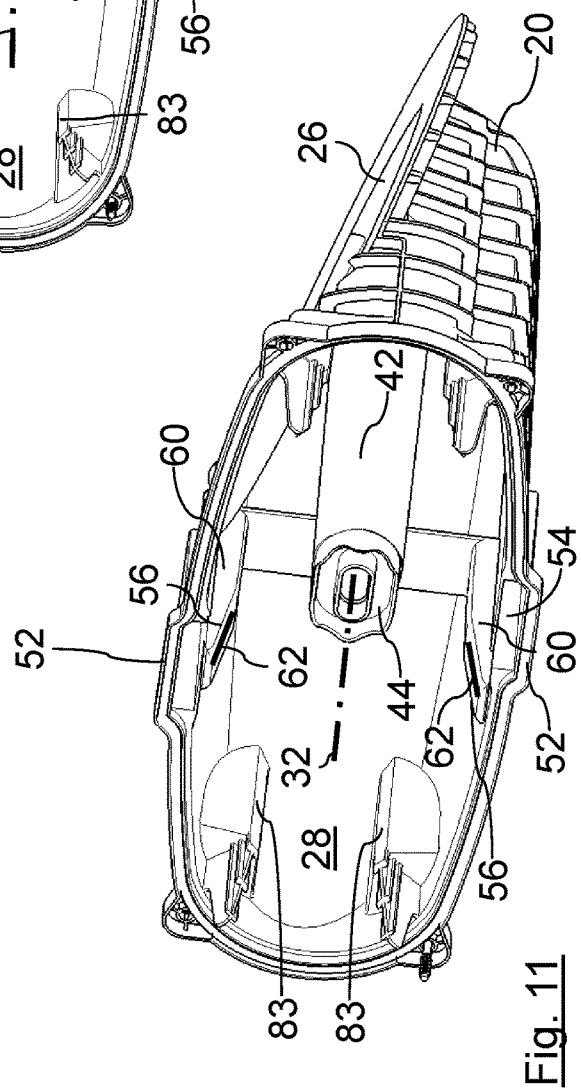
FIG. 11 schematically shows the isometric illustration of the housing cover from FIG. 10 from a different perspective.
Figure 15:
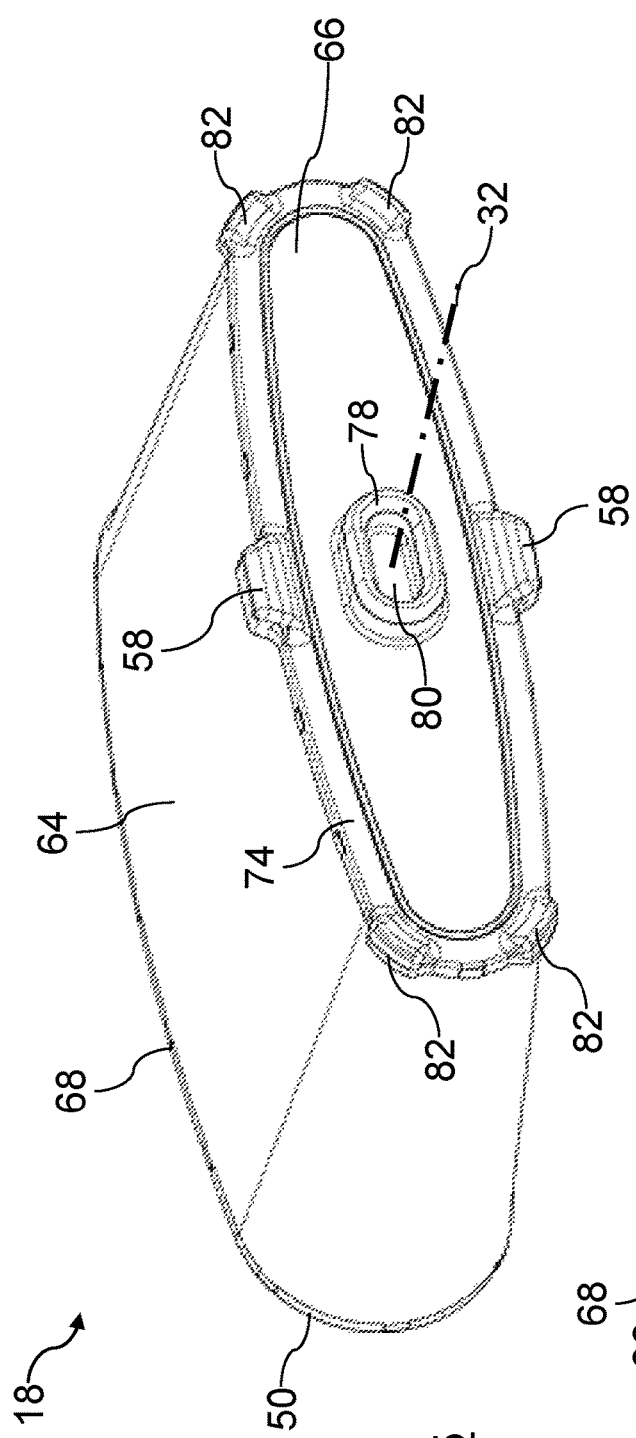
FIG. 15 schematically shows an isometric illustration of the rounded filter element of the air filter from FIGS. 1 to 5.
Figure 16:
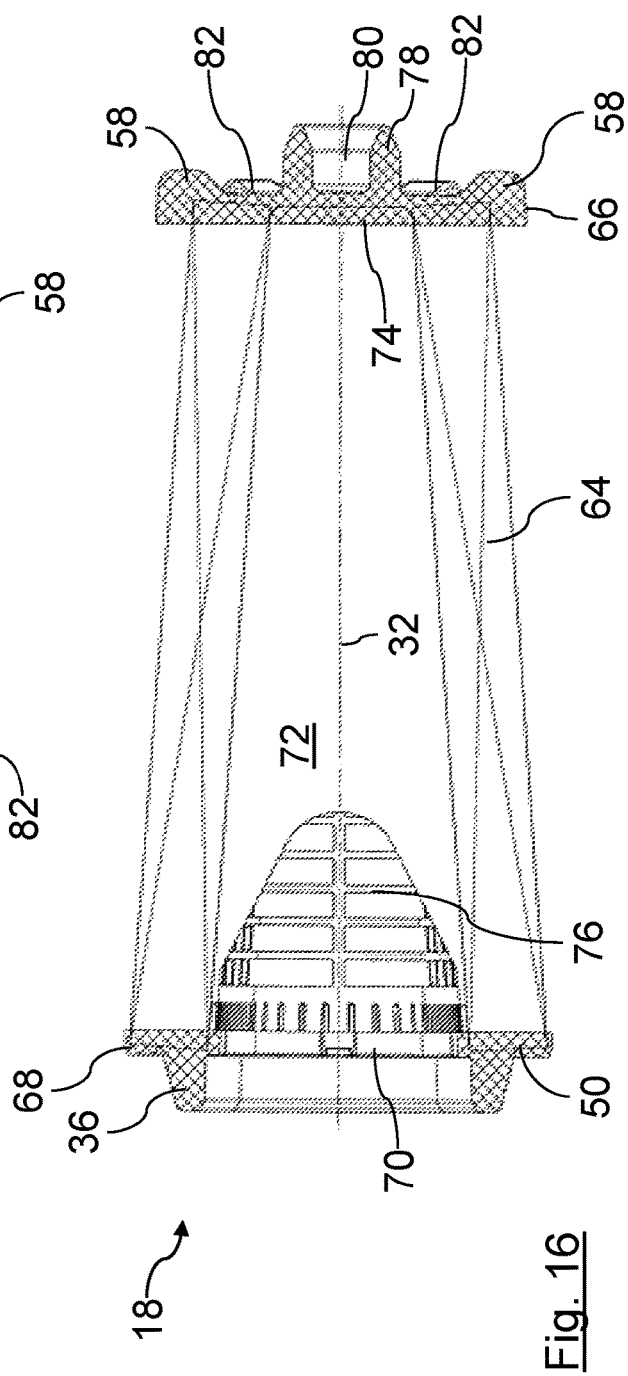
FIG. 16 schematically shows a transverse-side longitudinal section of the rounded filter element of the air filter from FIGS. 1 to 5.

A coaxial counter supporting groove 44, which extends peripherally with respect to a main axis of the supporting pillar 42, i.e., with respect to the filter axis 32, and which is shown for example in FIGS. 10 and 11, is arranged on the free end side of the supporting pillar 42 facing the filter element 18. The counter supporting groove 44 is an annular cavity in the supporting pillar 42 that is open toward the free end side of the supporting pillar 42.

The housing pot 14 also has two connecting tabs 46 for connecting to the housing cover 20. The connecting tabs 46 are located on the flattened peripheral sides of the housing pot 14 lying opposite with respect to the filter axis 32. The connecting tabs 46 are each integrally fastened by means of one end to the free peripheral edge of the housing pot 14 that surrounds the installation opening 16. The connecting tabs 46 extend parallel to the assembly axis of the assembly of the housing cover 20 with the housing pot 14, i.e., parallel to the filter axis 32. Imaginary center axes of the connecting tabs 46 lies in an imaginary plane having the filter axis 32. This imaginary plane, as viewed in the direction of the filter axis 32, is tilted in relation to another imaginary plane having a minor axis of the oval installation opening 16. The imaginary center axes of the connecting tabs 46 are thus each laterally offset with respect to the minor axis on opposite sides, as can be seen in FIG. 2 for example.

The inner faces of the connecting tabs 46 facing each other are smooth. The inner faces of the connecting tabs 46 each form a starting segment of corresponding guide ramps 48. The guide ramps 48 continue on the inner face of the housing pot 14. Respective radially outer peripheral sides of an outlet-side end plate 50 of the filter element 18 are guided on the guide ramps 48, for example at leveling elements 58, during the installation of the filter element 18 into the housing pot 14.

The outer faces of the connecting tabs 46 facing away from each other are equipped with stabilizing profiles.

On free edges of the connecting tabs 46 facing away from the free peripheral edge of the housing pot 14, the connecting tabs 46 are tapered in a wedge-like manner. This simplifies the insertion of the connecting tabs 46 into corresponding tab receptacles 52 of the housing cover 20 for connecting the housing pot 14 to the housing cover 20.

The housing cover 20 has two tab receptacles 52. The tab receptacles 52 each match one of the connecting tabs 46 of the housing pot 14.

The tab receptacles 52 are located on the flattened peripheral sides of the housing cover 20 lying opposite with respect to the filter axis 32. The tab receptacles 52 are each integrally arranged in the region of the free peripheral edge of the housing cover 20. The tab receptacles 52 are integrated in the peripheral wall of the housing cover 20.

The tab receptacles 52 each extend parallel to the assembly axis of the assembly of the housing cover 20 with the housing pot 14, i.e., parallel to the filter axis 32. Imaginary center axes of the tab receptacles 52 lie in a plane having the filter axis 32. This plane, as viewed in the direction of the filter axis 32, is tilted in relation to an imaginary plane having a minor axis of the oval installation opening 16. The center axes of the tab receptacles 52 are thus laterally offset with respect to the minor axis on opposite sides, analogously to the center axes of the connecting tabs 46.

The tab receptacles 52 are recesses that are peripherally closed with respect to the respective center axes of the tab receptacles 52, which center axes extend parallel to the filter axis 32. The connecting tabs 46 are each retained on all peripheral sides in the corresponding tab receptacle 52. The tab receptacles 52 have a corresponding insertion opening 54 for the corresponding connecting tab 46 on the side of the tab receptacles 52 facing the housing pot 14.

When the housing cover 20 is in the mounted state, the connecting tabs 46 stabilize the peripheral-wall segments of the housing cover 20 mechanically and vice versa. The connecting tabs 46 support the peripheral-wall segments radially to the filter axis 32, i.e., radially to the element axis and to the housing axis.

The housing cover 20 also has two guide tracks 56 for guiding and supporting corresponding leveling elements 58 of the filter element 18. The guide tracks 56 can be seen for example in FIGS. 9 to 11. The guide tracks 56 are located on diagonally opposite, radially inner peripheral sides of the housing cover 20 with respect to the filter axis 32.

The guide tracks 56 are each realized on a guide arm 60. The guide arms 60 are integrally connected by means of a longitudinal side to the corresponding radially inner peripheral side of the peripheral wall of the housing cover 20 within an interior space of the housing cover 20, which interior space contributes to the formation of the inlet space segment 28. The opposite longitudinal sides of the guide arms 60 form the corresponding guide tracks 56.

The guide arms 60 each protrude from the interior of the housing cover 20, for example. Particularly outside the housing cover 20, the guide arms 60 are each beveled on the radially inner longitudinal sides having the guide tracks 56. The corresponding guide tracks 56 thus extend toward the filter axis 32, as viewed in the direction filter axis 32 toward the interior of the housing cover 20.

The guide tracks 56 each extend by means of an imaginary main guide line 62 in a plane having the assembly axis, i.e., the filter axis 32, of the assembly of the housing cover 20 with the housing pot 14 and the filter element 18. The main guide lines 62 specify a path of a contact region of the corresponding leveling element 58 during the sliding on the corresponding guide track 56 during the placement of the housing cover 20 onto the filter element 18. During the closing of the housing cover 20, the guide arms 60 thus touch the leveling elements 58 from radially outside in the region of the main guide line 62 and continuously raise the filter element 18 until the filter element 18 has reached the central end position thereof in the completely closed state. The main guide lines 62 are located in an imaginary minor plane, which is spanned by the minor axis of the flat-oval base area of the installation opening 16 and the filter axis 32.

The filter element 18 described in more detail below is shown in different perspectives and sections in FIGS. 15 to 19. The filter element 18 is a flat conical-oval rounded filter element. The filter element 18 is coaxial to the element axis, i.e., to the filter axis 32.

The filter element 18 has a flat-oval cross-section. The short transverse axis, i.e., the minor axis, of the oval lies in the drawing plane of FIG. 15, and the long transverse axis, i.e., the major axis, is perpendicular to the drawing plane. The filter element 18 is additional flattened in the direction of the short transverse axis, thus the designation "flat conical-oval". In contrast thereto, "oval" refers to an approximately elliptical cross-section. A radially outer peripheral side and a radially inner peripheral side of the filter element 18 each have a conical course in the direction of the filter axis 32. The outside cross-section and the inside cross-section of the filter element 18 are tapered from the outlet-side end side 68 of the filter element 18 facing the outlet space segment 24 to the inlet-side end face 66.

The direction of the minor axis of the flat-oval filter element 18 extends spatially vertically in the final installation position in the typical operating position. The filter axis 32 extends spatially horizontally in the installation position in the typical operating position.

The filter element 18 comprises a filter medium 64 that is folded into a filter bellows in a zig-zag shape and that is peripherally closed with respect to the element axis, i.e., the filter axis 32. The filter medium 64 is a filter nonwoven suitable for filtering air.

The extent of the filter bellows composed of filter medium 64 in a direction radial to the element axis, i.e., to the filter axis 32, is less on the inlet-side end side 66 of the filter medium 64 than on the outlet-side end side 68 of the filter medium 64.

On the outlet-side end side 68 of the filter medium 64, the filter medium 64 is connected to the outlet-side end plate 50. The outlet-side end plate 50 is coaxial to the filter axis 20. The outlet-side end plate 50 is made of a plastic. The outlet-side end plate 50 is tightly adhesively bonded to the end side 68 of the filter medium 64. The radially outer peripheral side of the outlet-side end plate 50 lies against the radially inner peripheral side of the housing pot 14 there with minimal play.

The outlet-side end plate 50 has a central, coaxial outflow opening 70. The outflow opening 70 extends over the entire radially inner cross-section of the filter medium 64. An element interior space 72 of the filter element 18, which element interior space 72 is surrounded by the filter medium 64, is connected to the outlet space segment 24 by means of the outflow opening 70.

The seal 36 is arranged on the outer face of the outlet-side end plate 50 that axially faces away from the filter medium 64. The seal 36 is composed of elastic polyurethane foam. The seal 36 is foamed onto the outlet-side end plate 50. The seal 36 is coaxial to the element axis, i.e., to the filter axis 32, and peripherally surrounds the outflow opening 70. The seal 36 extends in the axial direction. The seal 36 is supported in the axial direction on the sealing surface 34 of the housing pot 14.

On the inlet-side end side 66, the filter medium 64 is tightly connected to an inlet-side end plate 74. The inlet-side end plate 74 is composed of polyurethane. The inlet-side end plate 74 closes the element interior space 72 toward the inlet space segment 28. The inlet-side end plate 74 is tightly connected to the filter medium 64 similarly to the outlet-side end plate 50.

A coaxial supporting tube 76 extends in the element interior space 72, between the inlet-side end plate 74 and the outlet-side end plate 50. The supporting tube 76 is composed of plastic. The supporting tube 76 has a lattice-like construction. The peripheral side of the supporting tube 76 is permeable to air. The supporting tube 76 has a flat conical-oval shape that corresponds to the filter medium 64. The radially inner peripheral side of the filter medium 64 can be supported on the radially outer peripheral side of the supporting tube 76.

A supporting element 78 is arranged on the axial outer face of the inlet-side end plate 74 facing away from the element interior space 72. The supporting element 78 is located on the raw-air side of the filter medium 64. The supporting element 78 is firmly connected to the inlet-side end plate 74. The supporting element 78 is composed of an elastic polyurethane foam. The supporting element 78 is foamed onto the inlet-side end plate 74.

The supporting element 78 is sleeve-like. The supporting element 78 has the shape of a hollow cylinder, the main axis of which extends coaxially to the filter axis 32, i.e., to the element axis, in the embodiment example shown. A cavity 80 of the supporting element 78 is open on the end side of the supporting element 78 facing away from the inlet-side end plate 74. The supporting element 78 has an approximately oval cross-section. The short transverse axis of the supporting element 78 lies in the drawing plane in FIG. 16, and the long transverse axis of the supporting element 78 is perpendicular to the drawing plane. When the filter element 18 is in the installed state, the orientation of the supporting element 78 with respect to the filter axis 32 corresponds to the orientation of the supporting pillar 42 of the housing cover 20.

The segment of the supporting pillar 42 surrounded by the counter supporting groove 44 is inserted into the cavity 80 of the supporting element 78 when the filter element 18 is correctly mounted. The peripheral wall of the supporting element 78 is inserted into the counter supporting groove 44 of the supporting pillar 42.

On the free side of the supporting element 78 facing away from the end plate 74, the wall thickness of the supporting element 78 decreases in a conical segment toward the free edge. The insertion of the supporting element 78 into the counter supporting groove 44 of the supporting pillar 42 can thus be simplified.

By means of the supporting element 48, the filter element 18 is supported against the filter housing 12 via the supporting pillar 42. The support occurs radially, i.e., transversely to the filter axis 32, i.e., transversely to the element axis and to the housing axis, and axially. The interaction of the supporting element 48 with the supporting pillar 42 contributes to the radial and axial retention and positioning of the filter element 18 on the inlet side, i.e., on the raw-air side. A contribution to the retention of the filter element 18 in the filter housing 12 on the side facing the inlet space segment 28 can thus be made.

Furthermore, two supporting webs 82 are arranged on the radially outer edges of the inlet-side end plate 74 in the region of each of the short transverse sides. The supporting webs 82 each protrude beyond the inlet-side end plate 74 both in the radial direction and in the axial direction. The supporting webs 82 are each supported at corresponding supporting points 83 on the inner face of the housing cover 20 in the radial direction, which supporting points 83 are shown, among other things, in FIGS. 3, 10, and 11.

The leveling elements 58 mentioned above are located radially outside with respect to the element axis, i.e., the filter axis 32, on the inlet-side end plate 74. The leveling elements 58 are composed of polyurethane. The leveling elements 58 are integrally connected to the inlet-side end plate 74. The leveling elements 58 are arranged on a raw-air side of the filter element 18.

The leveling elements 58 are arranged on peripheral sides of the inlet-side end plate 74 that are diagonally opposite with respect to the filter axis 32. Imaginary center points of the leveling elements 58 are located on a minor axis of a flat-oval cross-section of the filter element 18. In the direction of the minor axis, the filter bellows of the filter element 18 has a smaller radial extent on the inlet-side end side 66 than on the outlet-side end side 68. The minor axis lies in an imaginary plane that extends parallel to the flat-oval base area of the filter element 18. The minor axis is the short axis of the imaginary plane through the center point of the imaginary plane. In contrast thereto, the major axis is the long axis of the imaginary plane through the center point of the imaginary plane.

The leveling elements 58 each extend radially and axially outward beyond the radially outer peripheral side of the filter bellows of the filter medium 64 and of the inlet-side end plate 74.

Distances of the radially outer peripheral sides of the leveling elements 58 from the filter axis 32 correspond to distances of the corresponding radially outer peripheral side of the outlet-side end plate 50 from the filter axis 32.

One of the leveling elements 58 is arranged spatially at the bottom in the final installation position of the filter element 18 in the filter housing 12 in the typical operating position of the filter housing 12.

By means of the leveling elements 58, a uniform radial distance with respect to the filter axis 32 between the radially outer periphery of the inlet-side end plate 74 and a facing radially inner periphery of the housing cover 20 is realized in order to form the gap 40.

When the filter housing 12 is in the assembled state, the tab receptacles 52 having the connecting tabs 46 are each arranged approximately on the same peripheral side of the filter housing 12 as one of the guide tracks 56 for one of the leveling elements 58. The tab receptacles 52/connecting tabs 46 and the corresponding leveling elements 58/guide tracks 56 are arranged peripherally at an offset from each other, wherein the tab receptacles 52/connecting tabs 46 overlap with the corresponding leveling elements 58/guide tracks 56 as viewed in the radial direction.

The guide tracks 56 are each arranged between one of the leveling elements 58 and one of the tab receptacles 52/connecting tabs 46. The guide tracks 56 are supported against a pressure of the leveling elements 58 by means of the connecting tabs 46/tab receptacles 52. The leveling elements 58 press from inside against the corresponding peripheral-wall segment of the housing cover 20. The connecting tabs 46 and the corresponding tab receptacles 52 each counter from outside.

During the operation of the air filter 10, the air to be filtered flows through the inlet 26, indicated by an arrow 84 in FIG. 1, into the inlet space segment 28. From there, the air passes substantially in the axial direction through the gap 40 into the inflow annular space 38 on the inflow side of the filter medium 64. The air flows through the filter medium 64 from radially outside to radially inside and is cleaned. The cleaned air flows through the peripheral side of the supporting tube 76 and enters the element interior space 72. The cleaned air leaves the element interior space 72 substantially in the axial direction and enters the outlet space segment 24. From there, the filtered air leaves the filter housing 12 through the outlet 22, indicated by an arrow 86 in FIG. 1.

The filter housing 12 can be opened for maintenance purposes, for example for cleaning or exchanging the filter element 18. For this purpose, the housing cover 20 is removed from the housing pot 14 in the axial direction. In the process, the supporting element 78 is automatically pulled out of the counter supporting groove 44 at the end of the supporting pillar 42. The connecting tabs 46 are pulled out of the tab receptacles 52. The leveling elements 58 slide along the guide tracks 56. The filter element 18 is pulled out of the element space segment 30 of the housing pot 14 in the axial direction. The filter element 18 can be replaced with a new filter element 18 or reinstalled after the cleaning.

For installation, the filter element 18 is inserted with the outlet-side end plate 50 first into the housing pot 14 in the axial direction until the seal 36 lies against the sealing surface 34. Then the housing cover 20 is set with the open side thereof first onto the installation opening 16 of the housing pot 14 in the axial direction. For this purpose, the connecting tabs 46 are inserted into the respective tab receptacles 52. The housing cover 20 is thus pre-adjusted on the housing pot 14.

As the housing cover 20 is slid onto the housing pot 14 in the axial direction, the connecting tabs 46 and the tab receptacles 52 interact as a guiding aid. As soon as the free ends of the guide arms 60 of the housing cover 20 reach the leveling elements 58, the guide arms 60 encompass the leveling elements 58 from outside on radially opposite sides. As the housing cover 20 is slid on further, the leveling elements 58 are then guided along the main guide lines 62 of the guide tracks 56 of the guide arms 60. The side of the filter element 18 having the inlet-side end plate 74 is continuously raised into the end position of the filter element 18 by means of the lower guide tracks 56 as the housing cover 20 is slid further. The filter element 18 is positioned and centered in the housing cover 20. Finally, during the further sliding, the supporting element 78 of the housing cover 20 is automatically inserted into the counter supporting groove 44 of the supporting pillar 42. In the process, the radially inner segment at the end of the supporting pillar 42 is inserted into the cavity 80 of the supporting element 78. The element axis extends coaxially to the housing axis in the correct installed state. The housing cover 20 is finally fastened to the housing pot 14 in a manner that is of no further interest here.

What is claimed is:

1. A hollow filter element, comprising:
a filter medium for filtering a fluid;
wherein the filter element is a conical-oval rounded filter element;
wherein the filter medium circumferentially surrounds an interior flow space of the filter element,
wherein the filter medium circumferentially encloses around an element axis such that filter medium at least in one direction radial to the element axis is smaller on a first of the end sides of the filter medium than on a second of the end sides of the filter medium;
wherein the filter medium has a first end body arranged at least on the smaller end side;
wherein the first end body has at least one leveling element in the at least one direction of the smaller extent with respect to the element axis in a radially outer segment with respect to the element axis;
wherein the first end body has a leveling element arranged on opposite peripheral sides that are diagonally opposite in the at least one direction of the smaller extent with respect to the element axis;
wherein a base area of the hollow filter element is elongated as an oval, at least in a region of the smaller end side;
wherein an imaginary center point of the at least one leveling element is located on a minor axis of an imaginary plane that extends parallel to the base area of the hollow filter element;
wherein center points of the opposite leveling elements are each located on the minor axis;
wherein the at least one leveling element projects radially outward beyond the radial outer peripheral side of the filter medium, and projections axially outward beyond an axial outer end face of the end body, projecting in an axial direction away from the filter medium;
a hollow cylindrical support element formed on and projecting axially outwardly from a central portion of the first end body;
when the hollow filter element is assembled into or removed from a filter housing, the at least one leveling element slides along at least one guide track in the filter housing;
when the at least one leveling element slides further along the at least one guide track of the filter housing, the hollow cylindrical support element is automatically inserted into a counter support groove of a supporting pillar in the filter housing.

2. The hollow filter element according to claim 1, wherein
wherein a distance of a radially outer peripheral side of the at least one leveling element from the element axis corresponds approximately to a distance of the corresponding radially outer peripheral side of the hollow filter element from the element axis on the larger end side.

3. The hollow filter element according to claim 1, wherein
the at least one leveling element is arranged spatially at the bottom of the filter element in a final installation position of the hollow filter element in a filter housing of a filter and in a typical operating position of the filter housing.

4. The hollow filter element according to claim 1, wherein
the hollow filter element has at least one supporting element on an outer face on the smaller end side, which outer face faces away from the element interior space.

5. A filter housing of a filter for fluid, comprising
an openable filter housing including
    a housing pot having an installation opening, a circumferentially closed outer wall and a bottom wall defining an interior chamber in the housing pot;
    a housing cover which closes over the installation opening;
    at least one inlet for fluid to be cleaned; and
    at least one outlet for cleaned fluid;
wherein the filter housing is configured and adapted to receive a hollow filter element into the interior chamber of the filter housing such that the filter element is exchangeably arranged within the interior chamber of the filter housing, the hollow filter element having:
    a filter medium;
    wherein the filter medium circumferentially surrounds an interior flow space of the filter element,
    wherein the filter medium circumferentially encloses around an element axis such that filter medium at least in one direction radial to the element axis is smaller on a first of the end sides of the filter medium than on a second of the end sides of the filter medium;
    wherein the filter medium has a first end body arranged on the smaller end side: and
    wherein the first end body has at least one leveling element in the at least one direction of the smaller extent with respect to the element axis in a radially outer segment with respect to the element axis;
wherein the filter housing is configured such that the filter element, when installed, seals to the housing to separate the at least one inlet from the at least one outlet;
wherein the installation opening of the housing pot is sized and adapted for the filter element to be installed therethrough into the interior chamber;
wherein the installation opening is crossed by and coaxial to the filter axis in an installed state of the hollow filter element;
wherein the installation opening is at least as large as a greatest outside dimension of the hollow filter element radial to the filter axis;
wherein the housing cover has a circumferentially closed outer wall and includes at least one guide track arranged on a radially inner surface of the circumferentially closed outer wall of the housing cover, the at least one guide track guiding and supporting at least one leveling element arranged radially outside with respect to the filter axis on a first end body of the hollow filter element;
wherein the guide track extends at least by means of at least one imaginary main guide line in a plane having an installation axis of the installation of the hollow filter element into an interior space surround by the circumferentially closed outer wall of the housing cover;
wherein the at least one guide track extends into a region outside the interior space of the housing cover.

6. The filter housing according to claim 5, wherein
at least two guide tracks are located on diagonally opposite radially inner surfaces of the circumferentially closed outer wall of the housing cover with respect to the element axis.

7. The filter housing according to claim 5, wherein
the housing pot or the housing cover has at least one connecting tab connecting to the other part of the filter housing.

8. The filter housing according to claim 6, wherein
a base area of the installation opening is elongate or oval, and the main guide line of the at least one guide track is located in a minor plane having a minor axis of the base area of the installation opening and having the installation axis, and the main guide lines of the opposite guide tracks are each located in the minor plane.

9. The filter housing according to claim 5, wherein
at least one supporting segment is arranged centrally in or on the filter housing with respect to a housing axis, which coincides with the element axis when the hollow filter element is in the installed state.

10. A filter for filtering air, water, fuel, oil, or urea-water solution for an internal combustion engine comprising
an openable filter housing including
    a housing pot having an installation opening, a circumferentially closed outer wall and a bottom wall defining an interior chamber in the housing pot;
    a housing cover which closes over the installation opening;
    at least one inlet for fluid to be cleaned; and
    at least one outlet for cleaned fluid;
a exchangeable hollow conical-oval rounded filter element, including:
    a filter medium;
    wherein the filter medium circumferentially surrounds an interior flow space of the filter element,
    wherein the filter medium circumferentially encloses around an element axis such that filter medium at least in one direction radial to the element axis is smaller on a first of the end sides of the filter medium than on a second of the end sides of the filter medium;
    wherein the filter medium has a first end body arranged on the smaller end side;
    wherein the first end body has at least one leveling element in the at least one direction of the smaller extent with respect to the element axis in a radially outer segment with respect to the element axis;
wherein the filter element is exchangeably arranged within the interior chamber of the filter housing;
wherein the filter element seals to the housing to separate the at least one inlet from the at least one outlet;
wherein the installation opening of the housing pot is sized and adapted for the filter element to be installed therethrough into the interior chamber;
wherein the installation opening is crossed by and coaxial to the filter axis in an installed state of the hollow filter element;

wherein the installation opening is at least as large as a greatest outside dimension of the hollow filter element radial to the filter axis;

wherein the housing cover has a circumferentially closed outer wall and includes at least one guide track arranged on a radially inner surface of the circumferentially closed outer wall of the housing cover, the at least one guide track guiding and supporting at least one leveling element arranged radially outside with respect to the filter axis on a first end body of the hollow filter element;

wherein the at least one guide track extends at least by means of at least one imaginary main guide line in a plane having an installation axis of the installation of the hollow filter element into an interior space surround by the circumferentially closed outer wall of the housing cover;

wherein the at least one guide track extends into a region outside the interior space of the housing cover.

* * * * *